Feb. 3, 1953    J. F. RUCHINSKI    2,627,568
MOTOR VEHICLE SWITCH
Filed April 5, 1950    2 SHEETS—SHEET 1
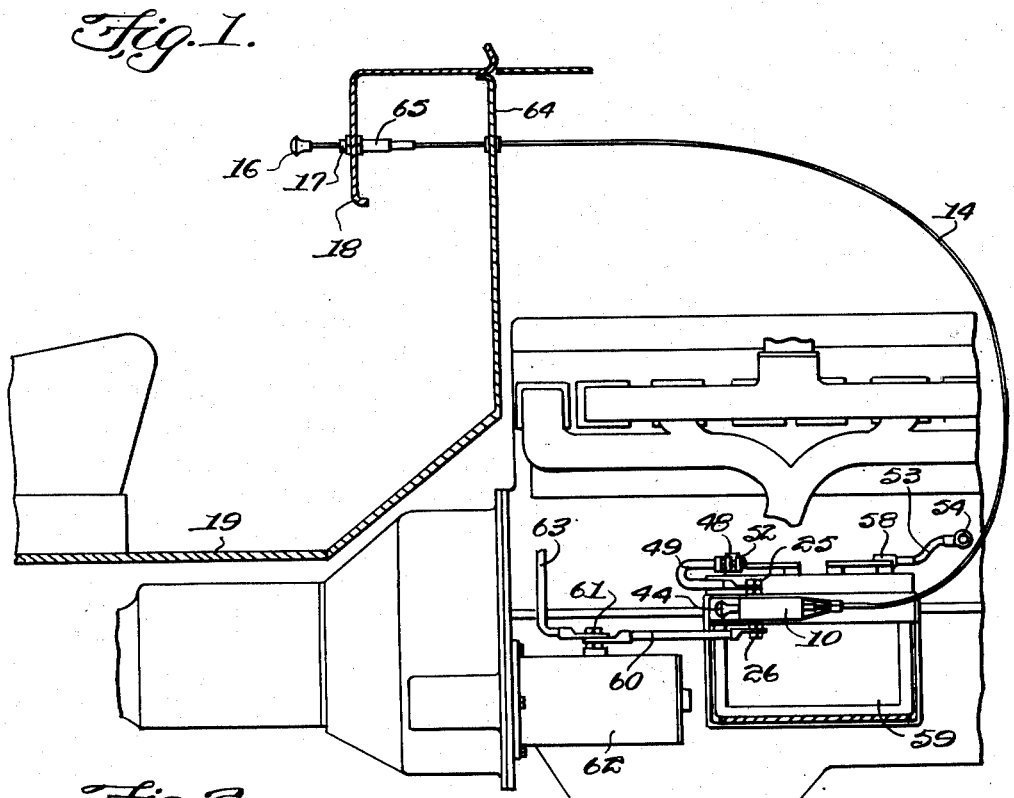
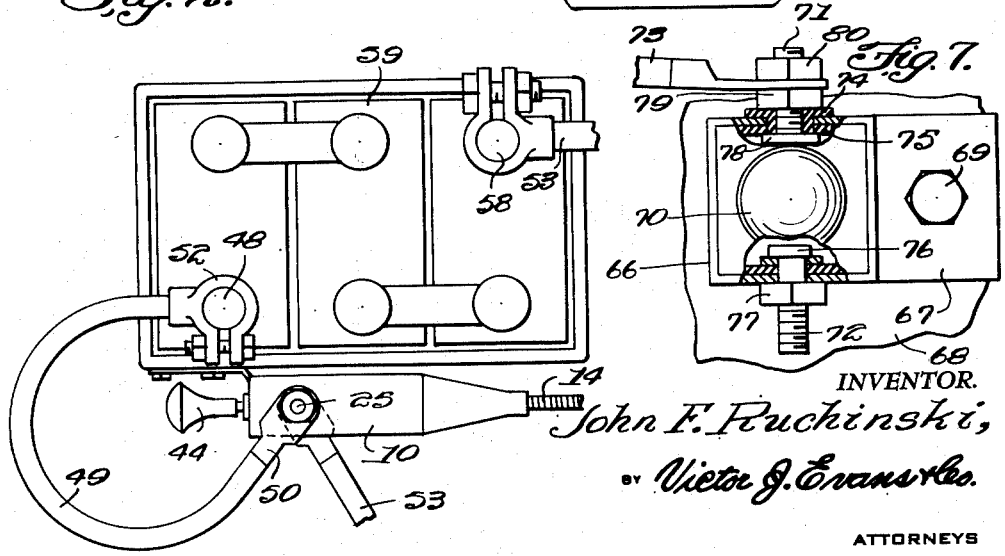
INVENTOR.
John F. Ruchinski,
by Victor J. Evans & Co.
ATTORNEYS Feb. 3, 1953          J. F. RUCHINSKI          2,627,568
MOTOR VEHICLE SWITCH
Filed April 5, 1950          2 SHEETS—SHEET 2
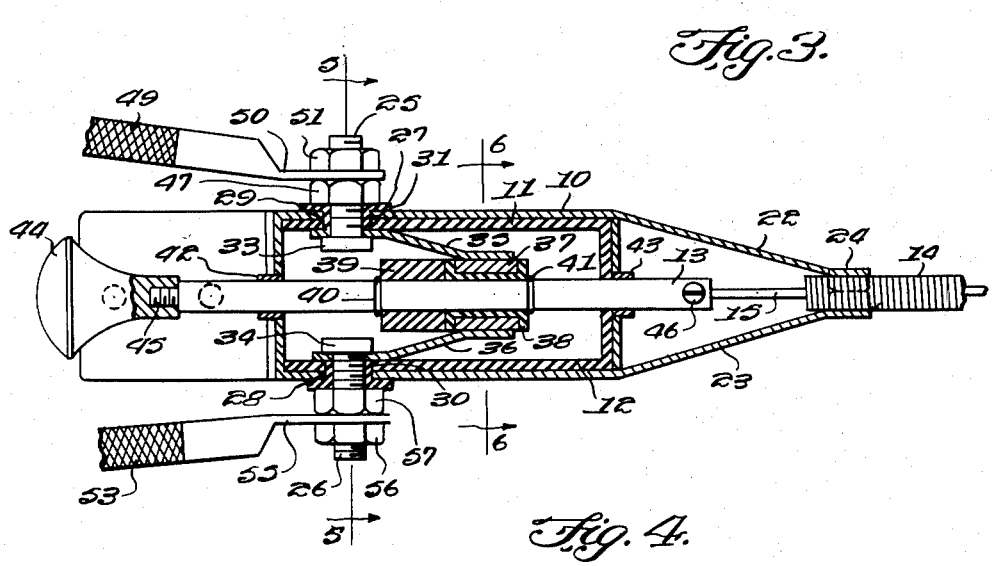
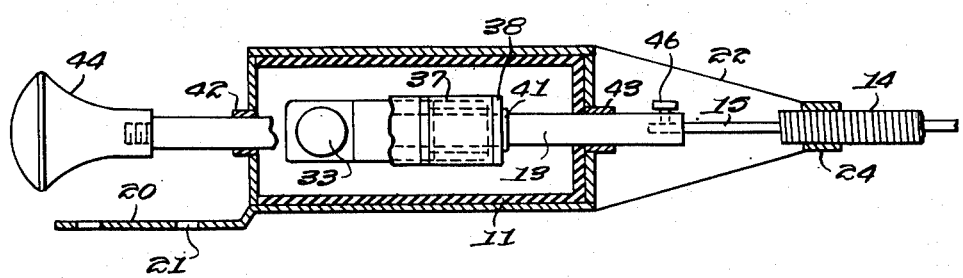
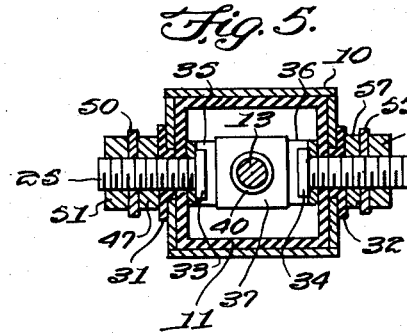
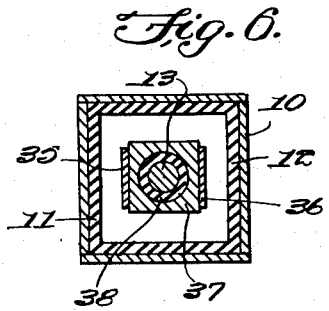
INVENTOR.
John F. Ruchinski,
By Victor J. Evans & Co.
ATTORNEYS Patented Feb. 3, 1953

2,627,568

UNITED STATES PATENT OFFICE 2,627,568

MOTOR VEHICLE SWITCH

John F. Ruchinski, Wanamie, Pa.

Application April 5, 1950, Serial No. 154,063

2 Claims. (Cl. 200—163)

This invention relates to safety devices for protecting motor vehicles, particularly in storage from fire caused by a short circuit resulting from poor connections, worn insulation, or unsatisfactorily installed accessories such as heaters, radios, cigarette lighters and the like, and in particular the invention relates to a cylindrical type switch positioned in the positive or negative connection of the battery of the vehicle and provided with an operating rod extended through an armored cable whereby the switch is actuated from the instrument board of the vehicle.

The purpose of this invention is to provide means for disconnecting all electrical circuits in a motor vehicle from the instrument board of the vehicle when the vehicle is in storage.

Many fires are started from parked motor vehicles due to poor connections, worn insulation and the like and due to the usual type of battery connection, it is difficult to disconnect the battery from the electrical system of the vehicle. With this thought in mind this invention contemplates a cylindrical type of switch with terminal posts on the sides through which a battery terminal may be connected to the switch and the switch connected to the ground or to the starter motor, and with the switch actuated from the instrument board by an armored cable the circuit may readily be broken without disconnecting the wiring and without opening the engine hood.

The object of this invention is, therefore, to provide means for forming a switch so that it may be connected in the connection between the battery of a motor vehicle and the ground connection and operated from the instrument board.

Another object of the invention is to provide a switch for disconnecting the battery of a motor vehicle from the electrical system that may be mounted in the motor vehicle without changing parts thereof.

A further object of the invention is to provide a switch adapted to be connected to a battery terminal of a motor vehicle and actuated from the instrument board which is of a simple and economical construction.

Other features and advantages of the invention will appear from the following description taken in connection with the drawings wherein:

Figure 1 is an elevational view showing part of a motor vehicle engine with the battery positioned at one side thereof and with parts of the vehicle broken away, illustrating the position of the switch and the connection thereof to the instrument board of the vehicle.

Figure 2 is a plan view of the battery of the vehicle showing the mounting of the switch thereon.

Figure 3 is a vertical longitudinal section through the switch illustrating the position of the parts with the switch closed.

Figure 4 is a similar view taken at a right angle to that shown in Figure 3.

Figure 5 is a cross section through the terminals of the switch taken on line 5—5 of Figure 3.

Figure 6 is a cross section through the switch taken on line 6—6 of Figure 3.

Figure 7 is a detail showing an end elevational view of the switch, and showing a modification wherein the mounting flange extends from one side of the casing.

Referring now to the drawings wherein like reference characters denote corresponding parts the battery disconnecting switch of this invention includes a casing 10 having insulating liners 11 and 12 at the sides, a contact carrying shaft 13 slidably mounted in the casing and an armored cable 14 having a flexible rod 15 extended therethrough and connected, at one end to the shaft 13 and, at the other to a knob 16 which is mounted in a bushing 17 in an instrument panel 18 of a motor vehicle 19.

In the design shown the casing 10 is formed with a mounting clip 20 having bolt holes 21 therein extended from one end and with arms 22 and 23 extended from the opposite end. The cable 14 is crimped in the outer end of the arms 22 and 23 with the ends of the arms providing a hub 24 in which the ends of the cable are held.

The casing 10 is provided with oppositely positioned terminal posts 25 and 26 which extend through openings 27 and 28 in opposite walls of the casing and insulating bushings 29 and 30 positioned in the openings around the posts to insulate the posts from the casing. Insulating washers 31 and 32 are also provided around the posts and positioned against the outer surfaces of the walls of the casing. The posts 25 and 26 are provided with heads 33 and 34 respectively and contact fingers 35 and 36 are carried by the inner ends of the posts, the fingers being extended for engagement with a conducting bushing or sleeve 37 in an insulating bushing 38 on the shaft 13. A fiber bushing 39, of the same diameter as the bushing 37 is positioned against one end of the insulating bushing 38 and the bushings are secured in position on the shaft by locking elements 40 and 41.

With the parts arranged in this manner the shaft 13, which is slidably mounted in hubs 42 and 43 in the ends of the casing 10 may be slid lengthwise by the flexible rod 15 with the knob 16 on the outer end, or by a knob 44 which is threaded on a stud 45 at the end of the shaft 13 whereby the contact bushing 37 moves away from the spring fingers 35 and 36 and the fingers ride upon the fiber bushing 39. In this movement the contacts or electrical connections to the switch are broken. The flexible rod 15 is connected to the outer end of the shaft 13 by a screw 46, as shown in Figures 3 and 4.

As illustrated in Figures 1 and 3 the post 25, which is secured in position by a nut 47 is connected to a battery terminal 48 by a connector 49 with one end 50 of the connector secured on the post 25 by a nut 51. The opposite end of the connector is provided with a clamp 52 by which it is connected to the battery terminal 48.

The other terminal 58, of the battery, which is indicated by the numeral 59 is connected by a connector 53 at one end, to a bolt 54 of the motor housing. The post 26 is connected by a connection 60 to a terminal 61 of a starter motor 62, the terminal 61 being connected to the starter switch by a connection 63.

The end of the cable 60 is provided with a connection 55 by which it is secured to the post 26 by a nut 56, and the post is clamped in the casing by a nut 57.

The armored cable 14 extends from the switch casing 10 to the coupling 17 on the instrument board through a fitting 64 and a coupling member 65.

With the parts arranged in this manner the electric circuit of the vehicle is readily broken by drawing the knob 16 outwardly, as illustrated in Figure 1, and the circuit may be instantly completed by pressing the knob inwardly. The switch may also be actuated by the knob 44, as described.

In the design illustrated in Figure 7 a casing 66 similar to the casing 10 is provided with a laterally extended flange 67 that may be connected to a block or frame 68 by a bolt 69 whereby the casing is positioned at one side or in close proximity to the battery. In this design the switch is provided with a knob 70 similar to the knob 44 and terminal posts 71 and 72 corresponding to the posts 25 and 26, respectively, are mounted in the sides with the post 71, which is connected to a ground wire 73 of the battery insulated from the casing by a bushing 74 and a washer 75, both of insulating material. The post 72 is directly connected to the casing with a head 76 in the casing and a nut 77 on the outer end. The post 71 is provided with a head 78 and a nut 79, and the wire 73 is held thereon by a nut 80.

It will be understood that modifications may be made in the design and arrangement of the parts without departing from the spirit of the invention.

What is claimed is:

1. In a battery terminal safety switch, an elongated box-like casing having a lining of insulating material extended over the sides and one end thereof, a centrally positioned longitudinally disposed shaft extended through the casing and having a knob on an extended end thereof, an insulating bushing positioned in the casing and mounted on the intermediate part of the shaft, a conducting ring positioned on one end of said bushing, terminal posts mounted in opposite sides of said casing, and contact fingers carried by the inner ends of said posts and extended for engagement with the insulating bushing with the shaft in one position and the conducting ring with the shaft in another position.

2. A battery terminal safety switch comprising an elongated casing, insulated liners positioned within said casing, a sliding shaft extending longitudinally through said casing and having a knob on one extended end thereof, an armored cable having a flexible rod extending therethrough, there being a socket in the other end of said shaft for receiving said rod, a securing element extending into said socket for maintaining said rod immobile, a pair of diverging arms extending from an end of said casing and providing a hub for snugly receiving therein said cable, a pair of diametrically opposed terminal posts extending into said casing, an insulated bushing circumposed on each of said posts and provided with an annular rib arranged contiguous to the outer surface of said casing, a head arranged on the inner end of each of said posts, a contact finger extending inwardly from each of said heads, an insulating sleeve mounted on said shaft, there being an annular recess arranged in said sleeve defining a pair of annular spaced parallel flanges, a conducting bushing snugly seated in the recess in said sleeve and adapted to be engaged by the inner end of said fingers, an insulated shell positioned on said shaft and abutting one of said flanges, said shell having the same diameter as said conducting bushing, and locking elements arranged contiguous to the ends of said conducting bushing.

JOHN F. RUCHINSKI.

REFERENCES CITED

The following references are of record in the file of this patent:

UNITED STATES PATENTS

| Number | Name | Date |
|---|---|---|
| 1,887,883 | Churcher | Nov. 15, 1932 |
| 1,995,946 | Schild | Mar. 26, 1935 |
| 2,258,796 | O'Kelly | Oct. 14, 1941 |

FOREIGN PATENTS

| Number | Country | Date |
|---|---|---|
| 796,884 | France | Feb. 3, 1936 |
| 842,936 | France | Mar. 13, 1939 |